United States Patent
Zhu et al.

(10) Patent No.: US 12,195,307 B1
(45) Date of Patent: Jan. 14, 2025

(54) DEVICE FOR DETECTING IDLING TIME OF BRAKE SHOE OF MONORAIL HOIST AND DETECTION METHOD THEREOF

(71) Applicant: China University of Mining and Technology, Jiangsu (CN)

(72) Inventors: Zhencai Zhu, Jiangsu (CN); Yu Tang, Jiangsu (CN); Gang Shen, Jiangsu (CN); Xiang Li, Jiangsu (CN); Mengmeng Gao, Jiangsu (CN); Wei Wang, Jiangsu (CN); Yuxing Peng, Jiangsu (CN); Gongbo Zhou, Jiangsu (CN); Hao Lu, Jiangsu (CN); Qingguo Wang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/270,230

(22) PCT Filed: Sep. 19, 2022

(86) PCT No.: PCT/CN2022/119564
§ 371 (c)(1),
(2) Date: Jun. 29, 2023

(87) PCT Pub. No.: WO2023/206933
PCT Pub. Date: Nov. 2, 2023

(30) Foreign Application Priority Data

Apr. 29, 2022 (CN) .......................... 202210473189.0

(51) Int. Cl.
 *B60T 17/22* (2006.01)
 *B61H 7/04* (2006.01)
 *B66C 15/06* (2006.01)

(52) U.S. Cl.
 CPC ............ *B66C 15/065* (2013.01); *B60T 17/22* (2013.01); *B61H 7/04* (2013.01)

(58) Field of Classification Search
 CPC .......... B66C 15/065; B60T 17/22; B61H 7/04
 See application file for complete search history.

(56) References Cited

U.S. PATENT DOCUMENTS

| | | | |
|---|---|---|---|
| 8,910,806 B2 * | 12/2014 | Stinis ...................... | B66C 1/101 |
| | | | 212/326 |
| 9,994,433 B2 * | 6/2018 | Guo ........................ | B66D 3/02 |
| 11,993,493 B2 * | 5/2024 | Topp ........................ | B66D 5/28 |

FOREIGN PATENT DOCUMENTS

| CN | 203048428 | 7/2013 |
|---|---|---|
| CN | 106080648 | 11/2016 |

(Continued)

OTHER PUBLICATIONS

"International Search Report (Form PCT/ISA/210) of PCT/CN2022/119564", mailed on Jan. 18, 2023, pp. 1-5.

*Primary Examiner* — Freddie Kirkland, III
(74) *Attorney, Agent, or Firm* — JCIPRNET

(57) ABSTRACT

The disclosure discloses a device for detecting idling time of a brake shoe of a monorail hoist and a detection method thereof. The device includes a contact detection unit, a common end roller unit, an idling time detection unit and detection lines. The contact detection unit installed on a brake of the monorail hoist includes a tube in connection with the brake shoe. The common end roller unit is installed on a frame of the monorail hoist and corresponds to a travelling track. A metal probe corresponding to the travelling track is arranged inside the tube. A limiting bolt corresponding to a raised cylindrical block formed on the metal probe is formed on an inner side wall of the tube. The metal probe is contactable with the travelling track or the limiting bolt when the brake shoe brakes.

10 Claims, 2 Drawing Sheets

(56) References Cited

FOREIGN PATENT DOCUMENTS

| | | |
|---|---|---|
| CN | 106938822 | 7/2017 |
| CN | 113675017 | 11/2021 |
| CN | 114655184 | 6/2022 |
| DE | 4336954 | 3/1995 |
| DE | 202015104225 | 8/2015 |
| KR | 102225878 | 3/2021 |

* cited by examiner

DEVICE FOR DETECTING IDLING TIME OF BRAKE SHOE OF MONORAIL HOIST AND DETECTION METHOD THEREOF

CROSS-REFERENCE TO RELATED APPLICATION

This application is a 371 of international application of PCT application serial no. PCT/CN2022/119564, filed on Sep. 19, 2022, which claims the priority benefit of China application no. 202210473189.0, filed on Apr. 29, 2022. The entirety of each of the above mentioned patent applications is hereby incorporated by reference herein and made a part of this specification.

TECHNICAL FIELD

The present disclosure relates to the technical field of monorail hoists, specifically to a device for detecting idling time of a brake shoe of a monorail hoist and a detection method thereof.

RELATED ART

The braking system is the key component for the safe operation of the monorail hoist. The time difference between the time point when the control component of the braking mechanism of the monorail hoist starts to act to the time point when the brake comes into contact with the track is the idling time. The braking idling time is an important parameter for evaluating the performance of the braking system. The coal industry standard stipulates that the idling time of the monorail hoist should not exceed 0.7 s when the brake is applied. Therefore, it is necessary to accurately detect the braking idling time.

At present, the methods of detecting idling time mainly include a direct detection method and an indirect detection method. The direct detection method is to stick tin foil on the surface of the brake block and the track for detection, which can only be detected when the monorail hoist is stationary, and cannot achieve the idling time detection during the normal operation and braking of the monorail hoist. The indirect detection method is to install dynamic and static contacts on the brake of the driving part, which indirectly measures the contact signal between the brake block and the track by the contact signals of the dynamic and static contacts, thereby obtaining the idling time. However, this method cannot eliminate the impact of the assembly clearance between the components on the driving part of the monorail hoist on the idling time, nor can it eliminate the error caused by brake shoe abrasion in the measurement of idling time. Therefore, there is an urgent need to invent a device for detecting idling time of a brake shoe of a monorail hoist that can eliminate the above problems.

SUMMARY OF INVENTION

In view of the above-mentioned technical deficiencies, the objectives of the present disclosure are to provide a device for detecting idling time of a brake shoe of a monorail hoist and a detection method thereof, which can solve the problems of the large measurement error, low adaptability and easy interference of the conventional methods.

In order to solve the above-mentioned technical problems, the technical solutions adopted in the present disclosure are as follows.

A device for detecting idling time of a brake shoe of a monorail hoist is provided in the present disclosure. The device comprises a contact detection unit, a common end roller unit, an idling time detection unit, and detection lines. The contact detection unit is installed on a brake shoe of the monorail hoist. The common end roller unit is installed on a frame of the monorail hoist and corresponds to the travelling track. The contact detection unit includes a tube in connection with the brake shoe, and a metal probe corresponding to the travelling track is arranged in the tube. A raised cylindrical block is formed on the metal probe. A limiting bolt corresponding to the raised cylindrical block is formed on an inner side wall of the tube. The metal probe is contactable with the travelling track or the limiting bolt when the brake shoe brakes, and the idling time detection unit is electrically connected with the metal probe, the limiting bolt and an axle of the common end roller unit thorough the detection lines.

Preferably, the contact detection unit further includes the tube, a bevel ring, a top pipe, a directional ring I, a directional ring II and a resetting spring. An outer surface of the tube is threadedly connected with the brake shoe. A bottom part of the tube is provided with a circular hole for the detection lines to penetrate. A side face of the tube is provided with a threaded hole configured to install the limiting bolt. The bevel ring is installed inside the tube. The directional ring I is installed inside the bevel ring. One end of the bevel ring 103 approximate to the limiting bolt is provided with a bevel hole. Another end of the bevel ring away from the limiting bolt is provided with the threaded hole 2. A bottom part of the top pipe is connected with the threaded hole 2 on the bevel ring through an external thread, and a top part of the top pipe is flushed with an end face of the brake shoe approximate to the travelling track. The directional ring II is installed inside the top pipe. A ring bevel matched with the bevel hole on the bevel ring is arranged on the raised cylindrical block. One end of the metal probe away from the raised cylindrical block is passed through the directional ring I and the directional ring II in sequence, and is protruded outside of the brake shoe to correspond to the travelling track, and another end of the metal probe approximate to the raised cylindrical block is sleeved with the resetting spring. The resetting spring is in contact with the bottom part of the tube and the raised cylindrical block of the metal probe, and the limiting bolt is installed inside the threaded hole of the tube.

Preferably, a frictional coefficient between the bevel ring and the inner wall of the tube is greater than a tangent value for an angle between a bevel of the bevel ring and a horizontal plane.

Preferably, the tube, the bevel ring and the top pipe are made of hard insulating materials.

Preferably, a distance between a center line of the limiting bolt and an end face of the raised cylindrical block of the metal probe approximate to the limiting bolt ranges from 11 mm to 12 mm.

Preferably, a length of the metal probe protruding outside the brake shoe ranges from 1 mm to 2 mm.

Preferably, the common end roller unit further includes a support roller, a rolling bearing, a connecting nut, a gasket, a circlip and a key. The support roller is installed on the travelling track. The rolling bearing is installed inside the support roller. One end of the axle approximate to the support roller is fixed with the rolling bearing through the circlip, and another end of the axle away from the support roller is passed through the frame and is locked and fixed through the gasket and the bolt, and a middle part of the axle is fixed with the frame through the key.

Preferably, the support roller, the rolling bearing, and the axle are made of conductive materials.

Preferably, the rolling bearing is a deep groove ball bearing made of a high carbon chromium material.

A detection method for the above-mentioned device is further provided in the present disclosure. The method comprises the following steps.
  (1) A contact detection unit is installed on each brake shoe of the monorail hoist respectively, the common end roller unit is installed on the frame, and a wiring between the contact detection unit, the common end roller unit and the idling time detection unit is completed.
  (2) When a braking command is issued by the monorail hoist, a current time to is recorded by the idling time detection unit.
  (3) A signal is contacted by the idling time detection unit and a current time t is recorded by the idling time detection unit, after a metal probe contacts a travelling track.
  (4) Idling time Δt is calculated by the idling time detection unit, and the calculation formula is $\Delta t = t - t_0$.
  (5) When the idling time detection unit detects braking idling time Δt≥700 ms of a brake, an alarm is sent by the idling time detection unit to remind that the brake is abnormal and required to be repaired immediately.
  (6) When the idling time detection unit detects a contact signal between the limiting bolt of the brake and the metal probe, an alarm is sent by the idling time detection unit to remind that an abrasion loss of the brake shoe is excessive large and the brake shoe is required to be replaced in time.
  (7) Step (2) to Step (6) are repeated after the monorail hoist completes the braking.

The beneficial effects of the present disclosure lie in the following.
  1. The present disclosure solves the problem that the measurement accuracy of the idling time detection is affected by the gradually decreasing of the measurement accuracy of the idling time detection limited by the abrasion of the brake shoe. The contact detection device provided in the present disclosure can move back adaptively as a whole under the action of the contact compression force after the abrasion of the brake shoe by utilization of the wedge-shaped self-locking feature, which ensures the measurement accuracy after the abrasion of the brake shoe.
  2. The contact detection unit provided in the present disclosure can be embedded in the brake shoe, which can realize the detection of braking idling time at different positions during the operation of the monorail crane, and has little influence on the braking effect.
  3. The idling time detection device of the present disclosure effectively avoids the miscontact between the metal probe and the traveling track by means of insulating material isolation, and has a high detection reliability.
  4. The idling time detection method of the present disclosure not only has the idling time detection function, but also can prompt the abnormal condition of the brake on-line, and the method can send an early warning when the brake shoe is abraded excessively, thereby improving the safety of the monorail hoist braking system.
  5. The present disclosure has the advantages of simple structure, easy operation, convenient maintenance, strong adaptability and high practicability.

BRIEF DESCRIPTION OF DRAWINGS

In order to describe the embodiments of the present disclosure or the technical solutions in the prior art more clearly, the following briefly introduces the accompanying drawings that is required to be used in the description of the embodiments or the prior art. It will be apparent that the accompanying drawings in the following description are merely some embodiments of the present disclosure. For those of ordinary skill in the art, other accompanying drawings can also be obtained according to these accompanying drawings without any creative efforts.

DESCRIPTION OF REFERENCE NUMBERS

1. Contact detection unit; 101. Tube; 102. Metal probe; 103. Bevel ring; 104. Top pipe; 105. Directional ring I; 106. Directional ring II; 107. Resetting spring; 108. Limiting bolt; 2. Common end roller unit; 201. Support roller; 202. Axle; 203. Rolling bearing; 204. Nut; 205. Gasket; 206. Circlip; 207. Key; 3. Idling time detection unit; 4. Detection line; 5. Brake shoe; 6. Brake lever; 7. Travelling track; 8. Frame.

DESCRIPTION OF EMBODIMENTS

The following clearly and completely describes the technical solutions in embodiments of the present disclosure with reference to the accompanying drawings in the embodiments of the present disclosure. It will be apparent that the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
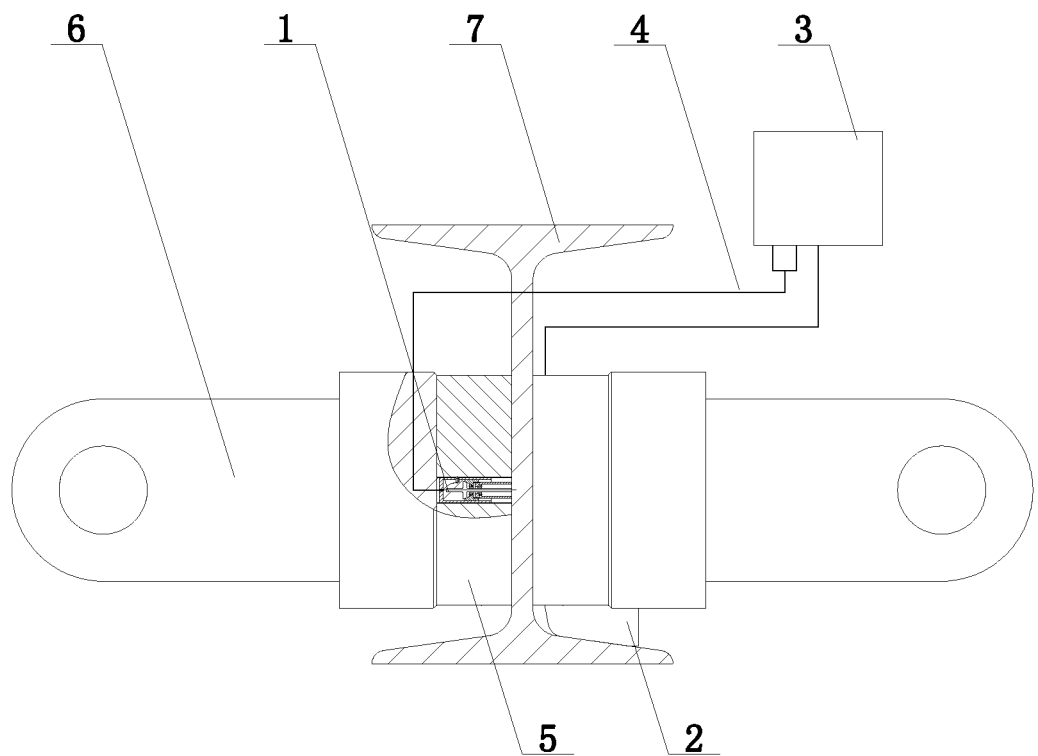
FIG. 1 illustrates a schematic diagram of an installation of a device for detecting idling time in the present disclosure.
Figure 2:
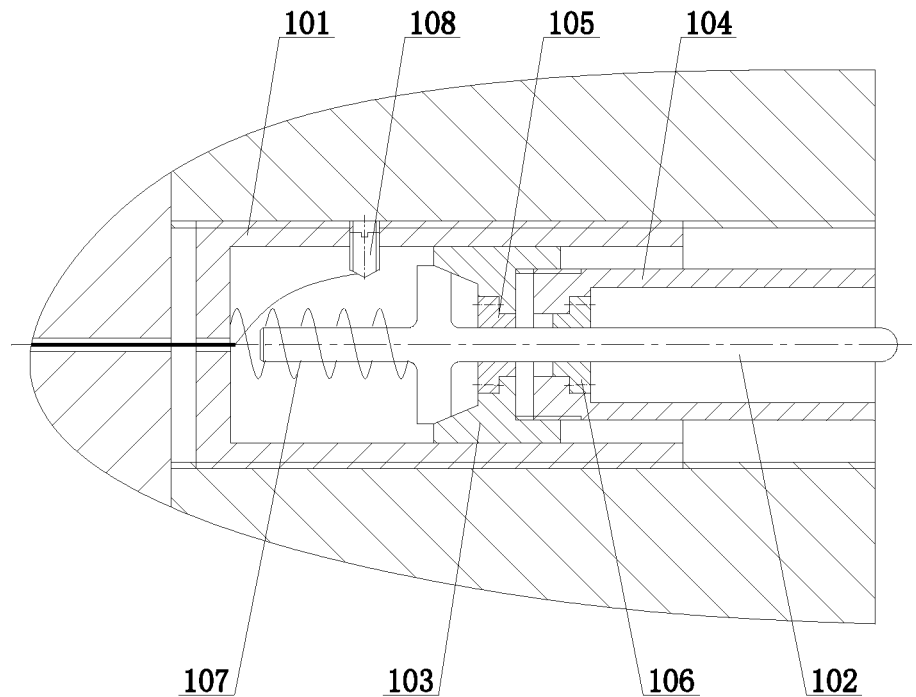
FIG. 2 illustrates a structural diagram of a contact detection unit in the present disclosure.
Figure 3:
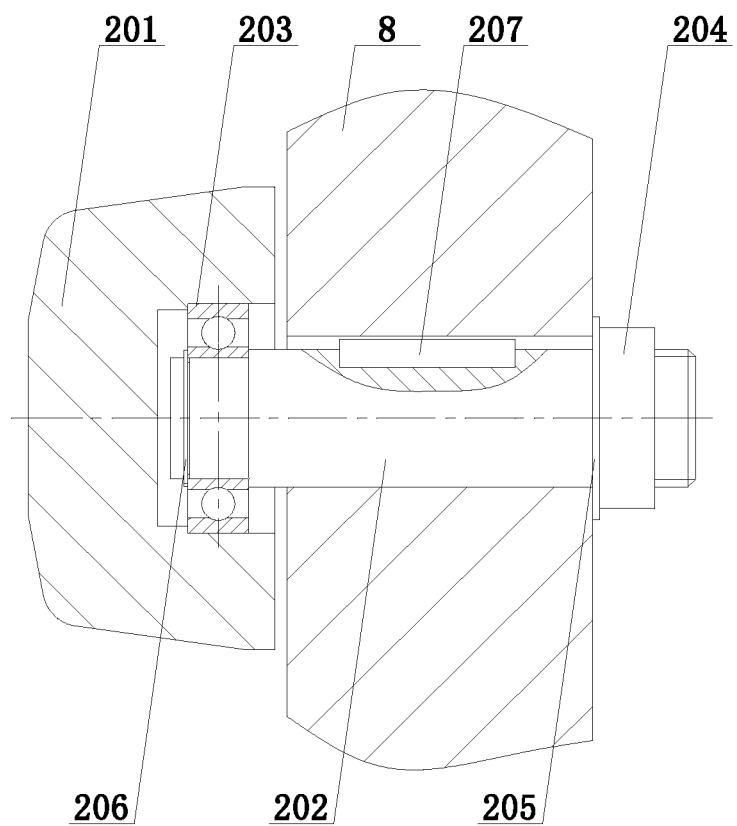
FIG. 3 illustrates a structural diagram of a common end roller unit in the present disclosure.

As illustrated in FIG. 1 to FIG. 3, provided is a device for detecting idling time of a brake shoe of a monorail hoist. The device includes a contact detection unit 1, a common end roller unit 2, an idling time detection unit 3, and detection lines 4.

The contact detection unit 1 includes a tube 101, a metal probe 102, a bevel ring 103, a top pipe 104, a directional ring I 105, a directional ring II 106, a resetting spring 107 and a limiting bolt 108. An outer surface of the tube 101 is provide with external threads matchedly installed with the brake shoe 5. A bottom part of the tube 101 is provided with a circular hole. A side face of the tube 101 is provided with a threaded hole 1 configured to install the limiting bolt 108. The bevel ring 103 is installed inside the tube 101. The directional ring I 105 is coaxially fixedly installed inside the bevel ring 103. One end of the bevel ring 103 approximate to the limiting bolt 108 is provided with a bevel hole, and one end of the bevel ring 103 away from the limiting bolt 108 is provided with a threaded hole 2. A bottom part of the top pipe 104 is provided with an external thread, which is connected with the threaded hole 2 of the bevel ring 103 through the external thread. The top part of the top pipe 104 is flushed with an end face of the brake shoe 5 approximate to the travelling track 7. The directional ring II 106 is coaxially fixedly installed inside the top pipe 104. A raised cylindrical block is arranged at a middle part of the metal probe 102. A ring bevel matched with a bevel hole on the inclined ring 103 is arranged on the raised cylindrical block. One end of the metal probe 102 approximate to the limiting bolt 18 is sleeved with a resetting spring 107, and another end of the metal probe 102 away from the limiting bolt 18 is passed through the directional ring I 105 and the directional ring II 103 in sequence. The resetting spring 107 is in contact with the bottom part of the tube 101 and the raised cylindrical block of the metal probe 102 respectively. The ring bevel on the raised cylindrical block of the metal probe 102 is tightly pressed into the bevel hole on the bevel ring 13 under the action of the resetting ring 107. The metal probe 102 is passed through the directional ring I 105 and one end of the directional ring II 106 to protrude outside the brake shoe 5, and the limiting bolt 108 is installed inside the threaded hole on the side face of the tube 101.

The common end roller unit 2 includes a support roller 201, an axle 202, a rolling bearing 203, a connecting nut 204, a gasket 205, a circlip 206 and a key 207. The support roller 201 is installed on the travelling track 7. The rolling bearing 203 is installed inside the support roller 201. One end of the axle 202 approximate to the support roller 201 is connected with the rolling bearing 203 through the circlip 206, and another end of the axle 202 away from the support roller 201 is passed through the frame 8 and is locked and fixed with the frame 8 through the gasket 205 and the bolt 204. A keyway is arranged at a middle part of the axle 202, and the middle part of the axle 202 is fixed with the frame 8 through the key 207.

The idling time detection unit 3 is connected with the metal probe 102, the axle 202 and the limiting bolt 18 through detection lines 18, respectively.

A frictional coefficient between the bevel ring 103 and the inner wall of the tube 101 is greater than a tangent value for an angle between a bevel of the bevel ring 103 and a horizontal plan.

The materials of the tube 101, the bevel ring 103 and the top pipe 104 are hard insulating materials well-known to those skilled in the art.

The detection lines 4 connected with the metal probe 102 passes through the circular hole at a bottom part of the tube 101.

The detection lines 4 connected with the limiting bolt 108 passes through the circular hole at a bottom part of the tube 101.

The distance between the center line of the limiting bolt 108 and the end face of the raised cylindrical block on the metal probe 102 approximate to the limiting bolt 108 ranges from 11 mm to 12 mm.

The installed limiting bolt 108 is not protruded from the outer surface of the tube 101.

One end of the metal probe 102 passing through the directional ring I 105 and the directional ring II 106 are protruded from the surface of the brake shoe 5 by 1 mm to 2 mm.

Redundant common end roller units are provided in this embodiment, which improves the reliability of the detection.

The brake shoe 5 of this embodiment is connected with a brake lever 6.

The rolling bearing 203 on the common end roller unit 2 adopts a deep groove ball bearing made of a high carbon chromium material.

The contact detection unit 1, the tube 101, the metal probe 102, the bevel ring 103, the top pipe 104, the directional ring I 105, the directional ring II 106, the resetting spring 107, the limiting bolt 108, the common end roller unit 2, the support roller 201, the axle 202, the rolling bearing 203, the nut 204, the gasket 205, the circlip 206, the key 207, the idling time detection unit 3, the detection line 4, the brake shoe 5, the brake lever 6, the travelling track 7, and the frame 8 provided in this embodiment adopts the existing products or structures well-known to those skilled in the art, and the connection modes among them also adopts the existing connection modes well-known to those skilled in the art, which are not described in detail herein.

Detecting the idling time of the monorail hoist by utilizing the above device includes the following steps.

a) A contact detection unit 1 is installed on each brake shoe 5 of the monorail hoist respectively, a common end roller unit 2 is installed on a frame 8, and a wiring between the contact detection unit 1, the common end roller unit 2 and an idling time detection unit 3 is completed.

b) When a braking command is issued by the monorail hoist, a current time t0 is recorded by the idling time detection unit 3.

c) A signal is contacted by the idling time detection unit 3 and a current time t is recorded by the idling time detection unit 3, after a metal probe 102 contacts a travelling track 7.

d) The idling time is calculated by the idling time detection unit 3, and the calculation formula is $\Delta t = t - t_0$.

e) When the idling time detection unit 3 detects braking idling time $\Delta t \geq 700$ ms of a brake, an alarm is sent by the idling time detection unit 3 to remind that the brake is abnormal and required to be repaired immediately.

f) When the idling time detection unit 3 detects a contact signal between a limiting bolt 108 of the brake and the metal probe 102, an alarm is sent by the idling time detection unit 3 to remind that the abrasion loss of the brake shoe is excessive large and the brake shoe is required to be replaced in time.

g) Step (b) to Step (f) are repeated after the monorail hoist completes the braking.

It will be apparent that various modifications and variations can be made by those skilled in the art in the present disclosure without departing from the spirit and scope of the present disclosure. Thus, if these modifications and variations of the present disclosure belong to the scopes of the claims of the present disclosure and their equivalents, the present disclosure is also intended to include these modifications and variations.

What is claimed is:

1. A device for detecting idling time of a brake shoe of a monorail hoist, comprising a contact detection unit, a common end roller unit, an idling time detection unit, and detection lines, wherein the contact detection unit is installed on a brake shoe of the monorail hoist, the common end roller unit is installed on a frame of the monorail hoist and corresponds to the travelling track, and the contact detection unit includes a tube in connection with the brake shoe, a metal probe corresponding to the travelling track is arranged in the tube, and a raised cylindrical block is formed on the metal probe, a limiting bolt corresponding to the raised cylindrical block is formed on an inner side wall of the tube, and the metal probe is contactable with the travelling track or the limiting bolt when the brake shoe brakes, and the idling time detection unit is electrically connected with the metal probe, the limiting bolt and an axle of the common end roller unit through the detection lines.

2. The device for detecting the idling time of the brake shoe of the monorail hoist according to claim 1, wherein the contact detection unit further includes the tube, a bevel ring, a top pipe, a directional ring I, a directional ring II and a resetting spring, an outer surface of the tube is threadedly connected with the brake shoe, a bottom part of the tube is provided with a circular hole for the detection lines to penetrate, a side face of the tube is provided with a threaded hole 1 configured to install the limiting bolt, the bevel ring is installed inside the tube, the directional ring I is installed inside the bevel ring, one end of the bevel ring approximate to the limiting bolt is provided with a bevel hole, and another end of the bevel ring away from the limiting bolt is provided with the threaded hole 2, a bottom part of the top pipe is connected with the threaded hole 2 on the bevel ring through an external thread, and a top part of the top pipe is flushed with an end face of the brake shoe approximate to the travelling track, the directional ring II is installed inside the top pipe, a ring bevel matched with the bevel hole on the bevel ring is arranged on the raised cylindrical block, one end of the metal probe away from the raised cylindrical block is passed through the directional ring I and the directional ring II in sequence, and is protruded outside the brake shoe to correspond to the travelling track, another end of the metal probe approximate to the raised cylindrical block is sleeved with the resetting spring, and the resetting spring raised cylindrical block is in contact with the bottom part of the tube and the raised cylindrical block of the metal probe, and the limiting bolt is installed inside the threaded hole 1 of the tube.

3. The device for detecting the idling time of the brake shoe of the monorail hoist according to claim 2, wherein a frictional coefficient between the bevel ring and the inner wall of the tube is greater than a tangent value for an angle between a bevel of the bevel ring and a horizontal plane.

4. The device for detecting the idling time of the brake shoe of the monorail hoist according to claim 2, wherein the tube, the bevel ring and the top pipe are made of hard insulating materials.

5. The device for detecting the idling time of the brake shoe of the monorail hoist according to claim 1, wherein a distance between a center line of the limiting bolt and an end face of the raised cylindrical block of the metal probe approximate to the limiting bolt ranges from 11 mm to 12 mm.

6. The device for detecting the idling time of the brake shoe of the monorail hoist according to claim 2, wherein a length of the metal probe protruding outside the brake shoe ranges from 1 mm to 2 mm.

7. The device for detecting the idling time of the brake shoe of the monorail hoist according to claim 1, wherein the common end roller unit further includes a support roller, a rolling bearing, a connecting nut, a gasket, a circlip and a key, the support roller is installed on the travelling track, the rolling bearing is installed inside the support roller, one end of the axle approximate to the support roller is fixed with the rolling bearing through the circlip, and another end of the axle away from the support roller is passed through the frame and is locked and fixed through the gasket and the bolt, and a middle part of the axle is fixed with the frame through the key.

8. The device for detecting the idling time of the brake shoe of the monorail hoist according to claim 7, wherein the support roller, the rolling bearing, and the axle are made of conductive materials.

9. The device for detecting the idling time of the brake shoe of the monorail hoist according to claim 8, wherein the rolling bearing is a deep groove ball bearing made of a high carbon chromium material.

10. A detection method for the device for detecting the idling time of the brake shoe of the monorail hoist according to claim 1, comprising following steps:
(1) installing the contact detection unit on each brake shoe of the monorail hoist respectively, installing the common end roller unit on the frame, and completing a wiring between the contact detection unit, the common end roller unit and the idling time detection unit;
(2) recording, by the idling time detection unit, a current time to, when a braking command is issued by the monorail hoist;
(3) detecting, by the idling time detection unit, a contact signal and recording a current time t, after the metal probe contacts the travelling track;
(4) calculating, by the idling time detection unit, idling time $\Delta t$, wherein a calculation formula is $\Delta t = t - t_0$;
(5) sending, by the idling time detection unit, an alarm to remind that the brake is abnormal and required to be repaired immediately, when the idling time detection unit detects braking idling time $\Delta t \geq 700$ ms of a brake;
(6) sending, by the idling time detection unit, an alarm to remind that an abrasion loss of the brake shoe is excessive large and the brake shoe is required to be replaced in time, when the idling time detection unit detects a contact signal between the limiting bolt of the brake and the metal probe; and
(7) repeating Step to Step, after the monorail hoist completes the braking.

* * * * *